United States Patent
Otsuki et al.

[11] 3,904,811
[45] Sept. 9, 1975

[54] OVERHEAD TRANSMISSION LINES WITH DAMPER MEANS FOR PREVENTING GALLOPING OSCILLATIONS

[75] Inventors: Akira Otsuki, Matsudo; Kimikazu Numata; Kazumitsu Kawai, both of Narita, all of Japan

[73] Assignee: The Fujikura Cable Works, Limited, Tokyo, Japan

[22] Filed: Nov. 21, 1973

[21] Appl. No.: 417,916

Related U.S. Application Data
[63] Continuation-in-part of Ser. No. 275,036, July 25, 1972, abandoned.

[30] Foreign Application Priority Data
July 28, 1971  Japan............................ 46-56667
July 30, 1971  Japan............................ 46-57351

[52] U.S. Cl................................. 174/42; 174/146
[51] Int. Cl.²..................... H02G 7/14; H02G 7/12
[58] Field of Search............. 174/40 R, 42, 43, 146, 174/149 R

[56] References Cited
UNITED STATES PATENTS

| | | | |
|---|---|---|---|
| 2,215,541 | 9/1940 | Buchanan et al. | 174/42 |
| 2,219,893 | 10/1940 | Goss | 174/42 |
| 2,999,894 | 9/1961 | Binder | 174/42 |
| 3,463,870 | 8/1969 | Eucker | 174/42 |
| 3,644,660 | 2/1972 | Dulhunty | 174/42 |
| 3,778,527 | 12/1973 | Nigol | 174/42 |

FOREIGN PATENTS OR APPLICATIONS

| | | | |
|---|---|---|---|
| 121,705 | 3/1931 | Austria | 174/42 |
| 1,044,195 | 11/1958 | Germany | 174/146 |
| 403,901 | 6/1966 | Switzerland | 174/146 |

*Primary Examiner*—Laramie E. Askin
*Attorney, Agent, or Firm*—Fidelman, Wolffe & Leitner

[57] ABSTRACT

In combination with an overhead transmission line a vibration damper for preventing galloping of the line including one or more specifically determined eccentric weights mounted on the line at a position laterally spaced from the axis of the conductor in case of a single-conductor transmission line, or at a position laterally spaced from the vertical plane including the axis of each conductor or the vertical plane including the center line of conductors in case of a multi-conductor transmission line. The eccentric weight thus mounted provides moment of inertia at the particular point where it is mounted. When the single conductor or multi-conductor line moves upward and downward, the conductor is subjected to moment of rotation resulting from the specifically determined eccentric weight as well as to an aerodynamic force caused by a lateral wind acting thereon, whereby the amplitude of the galloping oscillation is effectively suppressed to a desired level in the whole span of the transmission line.

7 Claims, 14 Drawing Figures

OVERHEAD TRANSMISSION LINES WITH DAMPER MEANS FOR PREVENTING GALLOPING OSCILLATIONS

CROSS-REFERENCE TO PRIOR APPLICATION

This is a continuation-in-part of our copending application Ser. No. 275,036, filed July 25, 1972, now abandoned.

BACKGROUND OF THE INVENTION

This invention relates to overhead transmission lines and more particularly to damper means for preventing galloping of the transmission lines.

Various phenomena of vibration have been observed in overhead transmission lines. For example, when an overhead transmission line exposed to a relatively uniform wind becomes coated with ice and/or snow, so that its cross-section has become asymmetrical relative to a stream of air, an oscillation is often induced having large amplitudes by scores of centimeters to scores of meters at a low frequency, e.g., 0.1 to 0.5 cycle per second. This oscillation is referred to as "galloping", and has been known for a long time as a cause of serious troubles such as short circuiting in overhead transmission lines, various fatigues and wear.

Figure 1:
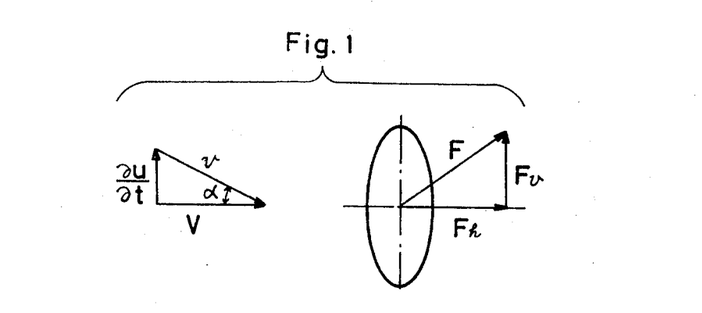
FIGS. 1 and 2 are schematic views useful for explaining the action of forces on an object when the object moves in upward and downward directions.
Figure 2:
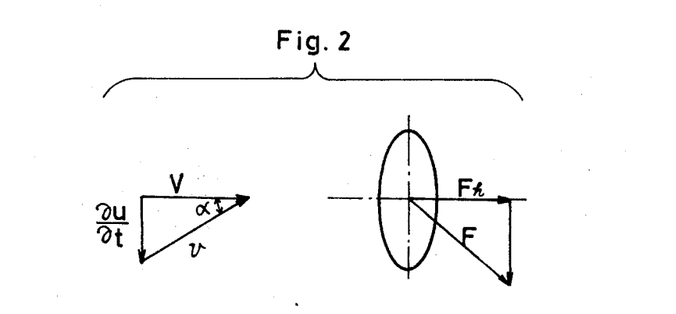

Prof. J.P. Den Hartog, Massachusetts Institute of Technology, U.S.A., has explained the cause of occurrence of such galloping oscillations in the following manner, which is an established theory heretofore employed. Illustratively stated, when an object having a section as shown in FIG. 1 is acted upon by a wind of velocity V (m/sec) in a traverse direction while moving vertically upwardly at a speed of $\delta u/\delta t$, the object will experience a wind blowing at an angle $$\alpha \text{ (angle of attack)} = \tan^{-1} \frac{\delta u}{\delta t}/V$$

at a relative speed of $$v = \sqrt{V^2 - \left(\frac{\delta u}{\delta t}\right)^2},$$

and as a result, a force F is exerted on the object. However, in the event that the object is elongated in a vertical direction as shown in FIGS. 1 and 2 the force exerted by that wind will have a vertical upward component Fv, as is the case with an airplane wing. Therefore, the object continues its upward movement until the energy furnished by the wind force is balanced with the energy which is consumed by the object, e.g. that required to cause a deformation of a transmission line against the spring action thereof. Thus, when the object has reached its uppermost limit, the value of $\delta u/\delta t$ becomes zero and at the same time the upward force Fv will disappear, resulting in the start of a downward vertical motion. During the downward motion, the vertical downward force Fv as shown in FIG. 2 is exerted on the object, and such a vertical motion goes on continuously.

Figure 3:
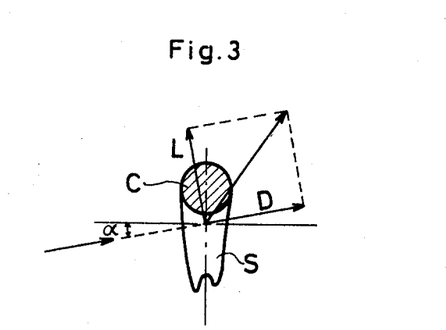
FIG. 3 is a schematic view showing a wind force acting on a snow-coated wire.

FIG. 3 represents the case where a transmission line C is coated with snow S and is moving downward in its vibrational motion so that the wind appears to come from below at an angle of $$\alpha = \tan^{-1} \frac{\delta u}{\delta t}/V.$$

The lift and drag forces L and D have vertical upward components of $L \cos \alpha$ and $D \sin \alpha$. The total upward damping force Fv of the wind is $$Fv = L \cos \alpha + D \sin \alpha \tag{1}$$

In performing the differentiation on equation (1), $$\frac{dF_v}{d\alpha} = \frac{dL}{d\alpha} \cos \alpha - L \sin \alpha + \frac{dD}{d\alpha} \sin \alpha + D \cos \alpha$$

It is to be noted that when $\delta u/\delta t$ is small with respect to V, and thus $\alpha$ is a small angle, the cosine of $\alpha$ equals unity and the sine of $\alpha$ is negligible with respect to unity. Therefore $$\frac{dF_v}{d\alpha} = \frac{dL}{d\alpha} + D.$$

The question here is not the force Fv itself, but rather $\delta F/\delta \alpha$, that is, a variation of the force Fv with respect to a variation of $\alpha$ or $$\frac{\delta u}{\delta t}/V.$$

If $\delta Fv/\delta \alpha$ is negative, the upward force Fv of the wind increases for a negative $\alpha$, and decreases for a positive $\alpha$. This apparently is the case where an encouraging alternating force constitutes the conditions for causing occurrence of galloping oscillations. Thus the galloping occurs when $$\frac{dF_v}{d\alpha} = \frac{dL}{d\alpha} + D < 0 \tag{2}$$

In view of the foregoing, it is considered that the occurrence of galloping oscillations is mainly affected by aerodynamic conditions. Accordingly, the previous measures preventing galloping oscillations have been mainly directed to modification of the aerodynamic character of a wire such as the mounting of wings. A few examples of such previous techniques are in U.S. Pat. No. 3,388,208 which discloses an aerodynamic stabilizer in the form of a rigid elongated element immovably affixed to the cable in a restricted portion of a span of overhead transmission lines, and U.S. Pat. No. 3,440,328 which discloses an aerodynamic damper comprising a pipe extending along the transmission lines and channel-defining sheet metal members mounted thereon.

However, the large scale experiments conducted by the inventors for a long period in a certain exclusive laboratory have revealed that the above devices of the prior art have not proved totally successful.

SUMMARY OF THE INVENTION

An object of the present invention is to provide an improved damper means for overhead transmission lines wherein an eccentric weight is mounted on the transmission line in a span thereof so as to control galloping vibrations occurring at the mounted portion, whereby the galloping vibrations may be effectively suppressed in the whole span of the line.

Another object of the invention is to provide an improved damper means for an overhead transmission line having a plurality of conductors, wherein a weight is mounted eccentric with respect to each vertical plane including the axis of respective conductor or to the center of the system whereby the galloping vibrations may be effectively suppressed.

A further object of the invention is to provide an improved damper means for an overhead transmission line system comprising a plurality of conductors, wherein a weight is mounted eccentrically with respect to the vertical plane including the center line of said system whereby the galloping vibrations may be effectively suppressed.

A further object of the invention is to prvide an improved damper means for an overhead transmission line system comprising a plurality of conductors, wherein a weight is mounted on a conductor spacer at a position eccentric with respect to the vertical plane including the center line of the system whereby the galloping vibrations may be prevented.

A still further object of the invention is to provide an improved damper means for an overhead transmission line system comprising a plurality of conductors, wherein a conductor spacer is mounted asymmetrical with respect to the vertical plane including the center line of the system, whereby the galloping vibrations may be effectively suppressed.

DETAILED DESCRIPTION OF THE PREFERRED EMBODIMENTS

As a result of our intensive studies on the countermeasures for prevention of galloping vibrations, an extremely useful solution has been found, which is based on the precise and correct theoretical analysis of the galloping vibration phenomenon as described below.

As will be understood from the foregoing description, the galloping oscillation is a sort of "self-exciting oscillation", which means an oscillation phenomenon where an alternating force effective to continuous oscillation is developed and controlled by itself, and the alternating force goes on until the motion stops. However, as is required for all other oscillation phenomena, a precise differential equation should first be formulated in order to grasp correctly the characteristics of the galloping characteristic.

Figure 4:
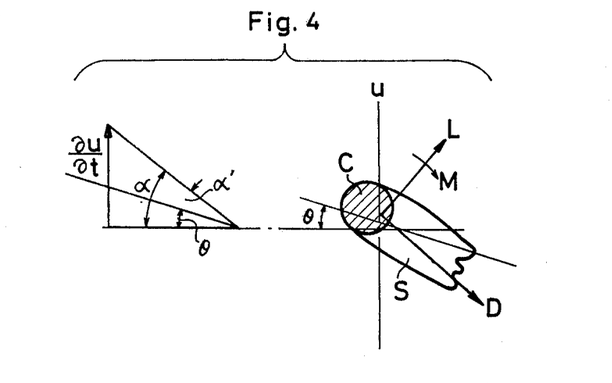
FIGS. 4 and 5 are views similar to FIG. 3, being useful for explaining the fundamental theory of the present invention.

In FIG. 4, there is shown the forces exerted on a part of a conductor C of a transmission line coated with snow S. Here, the vertical motion of translation (u axis) and its rotational motion about the center of gravity (coordinate $\theta$) will be taken into consideration. Letting the y direction represent the lengthwise direction of the object, the equation of motion for the object to be noted, that is, a wire of unit length is $$\frac{W}{g} \frac{\delta^2 u}{\delta t^2} + fu \frac{\delta u}{\delta t} - T \frac{\delta^2 u}{\delta y^2} = L \cos \alpha - D \sin \alpha \quad (3)$$

$$J \frac{\delta^2 \theta}{\delta t^2} + f\theta \frac{\delta \theta}{\delta t} - GI_p \frac{\delta^2 \theta}{\delta y^2} = M \quad (4)$$

where W is the weight of the object; J is the moment of inertia; fu, f$\theta$ are damping coefficients with respect to its vertical movement and rotation respectively; T is the tensile force on the wire; $GI_p$ is the torsional rigidity of a wire; D and L are the drag and lift forces respectively as imposed on the wire; and M is the rotational moment on the wire.

Supposing that L, D and M can each be represented by a polynomial expression with up to the second power of an angle of attack $\alpha$, a wind tunnel test gives the following formulae:

$$\left. \begin{array}{l} D = \rho d v^2 (C_{D0} + C_{D1}\alpha' + C_{D2}\alpha'Z)/2 \\ L = \rho d v^2 (C_{L0} + C_{L1}\alpha' + C_{L2}\alpha'Z)/2 \\ M = \rho d v^2 (C_{m0} + C_{m1}\alpha' + C_{m2}\alpha'Z)/2 \end{array} \right\} \quad (5)$$

where $\rho$ is the density of air; $d$ is the diameter of a wire; $v$ is the relative velocity of a wind; $C_{D0}$, $C_{D1}$, $C_{D2}$; $C_{L0}$, $C_{L1}$, $C_{L2}$; $C_{m0}$, $C_{m1}$, $C_{m2}$, are zero dimension constants. If $\theta$ is small, $\delta u/\delta t << V$;
$V = v$; $\cos \alpha = 1$; and $\sin \alpha = \alpha$;

$$\alpha \approx \frac{1}{V} \frac{\delta u}{\delta t}$$

$$\alpha' \approx \frac{1}{V} \frac{\delta u}{\delta t} - \theta$$

(FIG. 4)

If, using these above expressions, the formula (5) is substituted into the right side of the formulae (3) and (4), the vertically directed force Fv and the rotational moment M can be obtained. For the sake of simplification, if terms exceeding the second power are omitted herein, then the following are obtained:

$$Fy = L \cos \alpha - D \sin \alpha = \frac{pdV^2}{2}\left(C_{Lo} - C_{L1}\theta + \frac{C_{L1} - C_{Do}}{V} \cdot \frac{\delta u}{\delta t}\right) \quad (6)$$

$$M = \frac{pdV^2}{2}\left(C_{mo} - C_{m1}\theta + \frac{C_{m1}}{V} \cdot \frac{\delta u}{\delta t}\right) \quad (7)$$

Thus, formulae (3) and (4) are rearranged into:

$$\frac{W}{g}\frac{\delta^2 u}{\delta t^2} + \left\{fu - \frac{pdV(C_{L1} - C_{Do})}{2}\right\}\frac{\delta u}{\delta t} - T\frac{\delta^2 u}{\delta y^2} = -\frac{pdV^2 C_{L1}}{2}\theta \quad (8)$$

$$J\frac{\delta^2 \theta}{\delta t^2} + j\theta\frac{\delta \theta}{\delta t} - GI_p\frac{\delta^2 \theta}{\delta y^2} + \frac{pdV^2 C_{m1}}{2}\theta = \frac{pdVC_{m1}}{2}\frac{\delta u}{\delta t} \quad (9)$$

Considering that solutions in the form of the following are obtained from the formulae (8) and (9):

$$u = A \sin \frac{n\pi}{l} y e^{j\omega t}$$

$$\theta = \widehat{H} \sin \frac{n\pi}{l} y e^{j\omega t}$$

where A = maximum amplitude in the vertical direction, H = maximum amplitude in the rotational direction, e = base of the natural logarithm, and n = number of loops contained in a span. These $u$ and $\theta$ are then substituted into formulae (8) and (9) to eliminate variables y and t and to obtain formulae for frequency response:

$$\left[\left\{T\left(\frac{n\pi}{l}\right)^2 - \omega^2 \frac{W}{g}\right\} + j\omega\left\{fu - \frac{pdV(C_{L1} - C_{Do})}{2}\right\}\right] A = -\frac{pdV^2 C_{L1}}{2}\widehat{H} \quad (10)$$

$$\left[\left\{GI_p\left(\frac{n\pi}{l}\right)^2 - \omega^2 J + \frac{pdV^2 C_{m1}}{2}\right\} + j\omega j\theta\right]\widehat{H} = j\omega\frac{pdVC_{m1}}{2} A \quad (11)$$

Then, the following block chart is obtained in connection with the above formulae (10) and (11):

Thus, as will be understood, galloping oscillations represented by equations (8) and (9) can be regarded as being produced by a feedback control system as shown above. Therefore, the principle of theoretical design for prevention of galloping is to design a compensating network to stabilize the feedback network.

Generally stated, the stability criterion of a feedback network as shown below, being determined mathematically according to the determination method employing Bode diagram, is to satisfy $$\text{Gain} \; |G(j\omega) H(j\omega)| \leq 1 \quad (12)$$

with loop transfer function $G(j\omega) H(j\omega)$ made as phase angle $G(j\omega) H(j\omega) = 180°$. Thus, for elements of the compensating network, there are considered to include phase lag such as mass or moment of inertia, to include phase lead such as spring action and to include resistance such as friction, and combinations thereof. However, the present invention is to provide, noting the mass and moment of inertia of a wire, an eccentric weight, which in practice is simplest and has a great effect.

Figure 5:
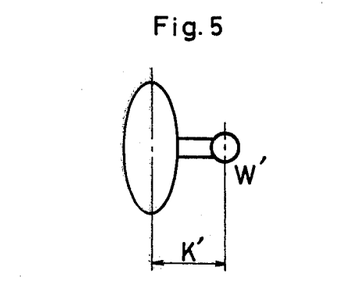

In the event the eccentric weight is mounted on the wire, as shown in FIG. 5, the motion thereof is represented in lieu of equations (8) and (9), by the following motion equations:

$$\frac{W}{g}\frac{\delta^2 u}{\delta t^2} + \left\{fu - \frac{pdV(C_{L1} - C_{Do})}{2}\right\}\frac{\delta u}{\delta t} - T\frac{\delta^2 u}{\delta y^2} = \frac{pdV^2}{2}(C_{Lo} - C_{L1}\theta) - \frac{W'}{g}\frac{\delta^2 u}{\delta t^2} \quad (13)$$

$$J\frac{\delta^2 \theta}{\delta t^2} + j\theta\frac{\delta \theta}{\delta t} + \frac{pdV^2 C_{m1}}{2}\theta - GI_p\frac{\delta^2 \theta}{\delta y^2} = \frac{pdV^2}{2}\left(C_{mo} + \frac{C_{m1}}{V}\frac{\delta u}{\delta t}\right) + \frac{K'W'}{g}\frac{\delta^2(u - K'\theta)}{\delta t^2} \quad (14)$$

where W' is the weight of the eccentric weight and K' is the distance between the center of gravity of the conductor and the center of gravity of the eccentric weight. Accordingly, the block chart for the motion is and K' and W' may well be selected so as to stabilize this network. In accordance with qualitative description, the foregoing stability criterion is $$\theta \geq \tan^{-1} \frac{\frac{\delta u}{\delta t}}{V} \text{ or } \alpha' \leq 0$$

and in terms of control theory, $$G = \frac{\rho d V^2 C_{LA}/2}{\left\{T\left(\frac{n\pi}{l}\right)^2 - \omega^2 \frac{W+W'}{g}\right\} + j\omega\left\{fu - \frac{\rho d V(C_{LA} - C_{D0})}{2}\right\}}$$

$$H = \frac{-\omega^2 \frac{K'W'}{g} + j\omega \frac{\rho d V^2 C_{m1}}{2}}{\left\{GI_p\left(\frac{n\pi}{l}\right)^2 - \omega^2\left(J + \frac{K'^2 W'}{g}\right)\right\} + \frac{\rho d V^2 C_{m1}}{2} + j\omega f\theta}$$

where
- $l$ is the span length of the transmission line,
- $d$ is the diameter of the line,
- $T$ is the tensile force of the line,
- $W$ is the weight of the line per unit length,
- $J$ is the moment of inertia of the line per unit length,
- $GI_p$ is the torsional rigidity of the line,
- $g$ is the gravity coefficient,
- $j$ is the notation used to designate imaginary numbers,
- $\omega$ is the circular frequency measured in radians per unit time,
- $V$ is the velocity of the lateral wind,
- $\rho$ is air density,
- $n$ is the numer of loops appearing in the span,
- $C_{LA}$ is the coefficient of the lift force caused by the wind,
- $C_{D0}$ is the coefficient of the drag force caused by the wind,
- $C_{m1}$ is the coefficient of rotational moment,
- $fu$ is the damping factor of the vertical motion of the line, and
- $f\theta$ is the damping factor of the rotational motion of the line.

In this instance, $|GH| \leq 1$ is obtained under the condition of $<GH \leq -180°$ in accordance with the determination method employing Bode diagram.

While the foregoing theory has been developed with a single-conductor transmission line, it should be understood that the theory could equally be applied to a multi-conductor transmission line. In the case the multi-conductor transmission line is considered to be one system, the eccentric weight may be mounted directly on a conductor composing such a system or alternatively mounted on the line through a spacer as will be mentioned later.

Whereas, in the case of the multi-conductor transmission line being considered to be composed of a plurality of systems, the eccentric weight having K'W' as determined in the case of a single-transmission line may be alternatively mounted on each conductor of the line to obtain the same effect. The symbols W, J, etc. appearing in the above expressions represent the total value of the respective measures of all the conductors concerned, and the center of the conductors is the center of gravity of a regular polygon where each conductor is disposed at an apex of the polygon.

Figure 6:
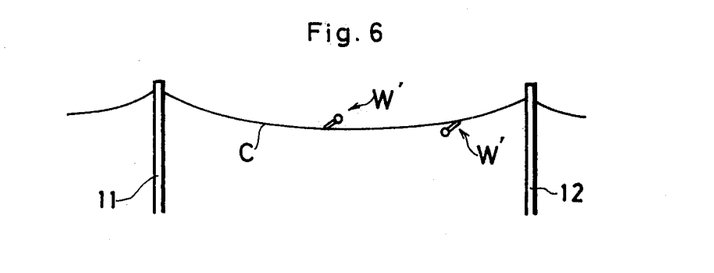
FIG. 6 is a simplified perspective view showing eccentric weights mounted in a span of a single-conductor overhead transmission line.
Figure 7:
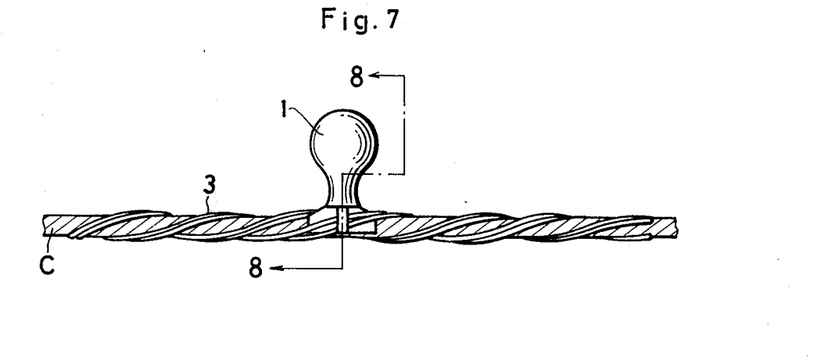
FIG. 7 is a fragmentary view showing one example of the manners of mounting an eccentric weight on a wire.
Figure 8:
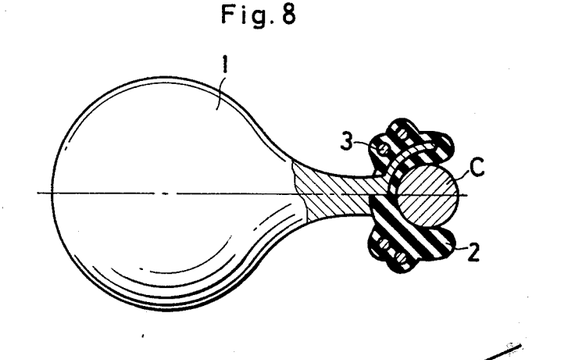
FIG. 8 is an enlarged side section along the line 8—8 of FIG. 7.

Some of the preferred embodiments of the present invention will now be described. The present eccentric weight is mounted, as shown in FIG. 6, in a span of a transmission line. That is, in a transmission line comprising a single conductor C supported between structures 11 and 12 such as a tower or pole at least one eccentric weight indicated at W' is mounted directly on the conductor by suitable means at any position in a span of the line. The method of mounting will be described with reference to FIGS. 7 and 8. For example, a weight 1 made of cast iron is secured to a U-shaped clamp 2, and the clamp 2 is adapted to make a gripping contact with the conductor C. A plurality of preformed rods 3 are passed through the clamp 2 and are wrapped around the conductor C in the vicinity of the clamp 2, as shown in FIG. 7, so that the weight 1 is fixed eccentric with respect to the vertical plane including the axis of the conductor C.

According to the fundamental theory of the present invention as aforementioned, galloping oscillations are controlled in a span of a line at a point where an eccentric weight is mounted which interferes with the galloping oscillations that are about to occur in the other parts of the line, so that galloping oscillations may be prevented from being developed in the whole span of the line.

When the eccentric weight W' is mounted on the conductor, the conductor is subject to a torsional moment resulting from the mass of the weight W'. In this connection, it is to be advised that an excessive torsional moment is preferably avoided. Thus, when a plurality of eccentric weights are mounted, it is preferable to offset the whole torsional moment without unifying the directions of the weights protruding from the conductor so that said directions may be at right angles with the vertical plane including the axis of the line.

Figure 9:
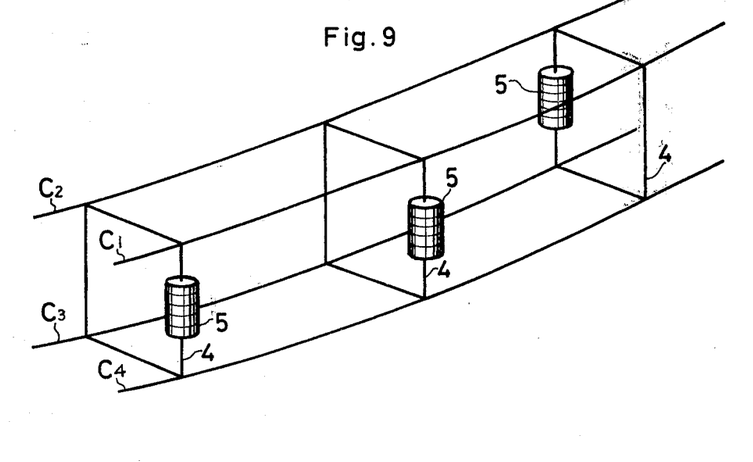
FIG. 9 is a simplified perspective view of an overhead transmission line system with each eccentric weight mounted on the body of a conductor spacer.

Referring to FIG. 9, which shows another embodiment of the present invention, each eccentric weight is mounted on a spacer which is provided to maintain a desired spacing between adjacent conductors.

Figure 10:
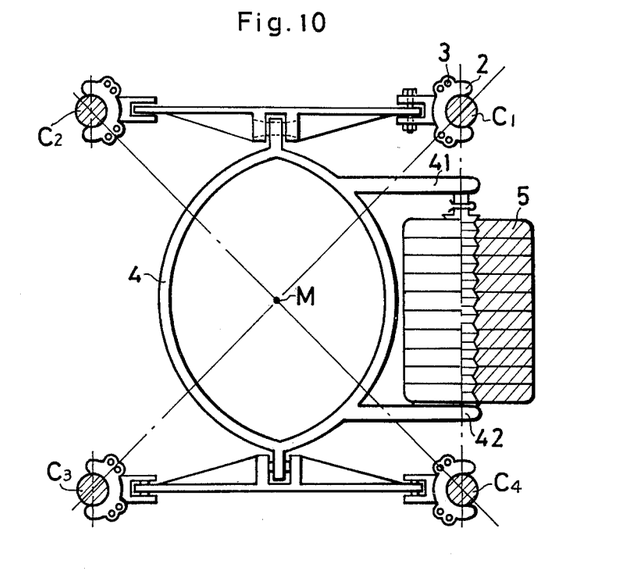
FIG. 10 is an enlarged side section showing one embodiment of the invention with an eccentric weight mounted on the body of the conductor spacer as shown in FIG. 9.

In FIGS. 9 and 10, C1, C2, C3 and C4 are four conductors constituting an overhead transmission line. A clamp 2 is held in gripping contact with the conductor and a preformed rod 3 secures the former to the conductor in similar manners to that of the embodiment described with reference to FIGS. 7 and 8, and each clamp is held in a predetermined position by means of spacer bodies 4. Arms 41 and 42 extend outwardly from the conductor spacer 4, and a weight 5 is mounted between the arms. The center of gravity of the weight 5 is spaced from the axial vertical plane including the center M of the line comprising four conductors C1, C2, C3 and C4, thus providing an eccentric with respect to the four-conductor line. In this embodiment, the whole transmission line comprising four conductors C1, C2, C3 and C4 is regarded as forming a single system, and galloping oscillations are prevented at a point where the eccentric weight is mounted in a span, resulting in elimination of galloping oscillations in the whole span of the line.

Figures 11, 12:
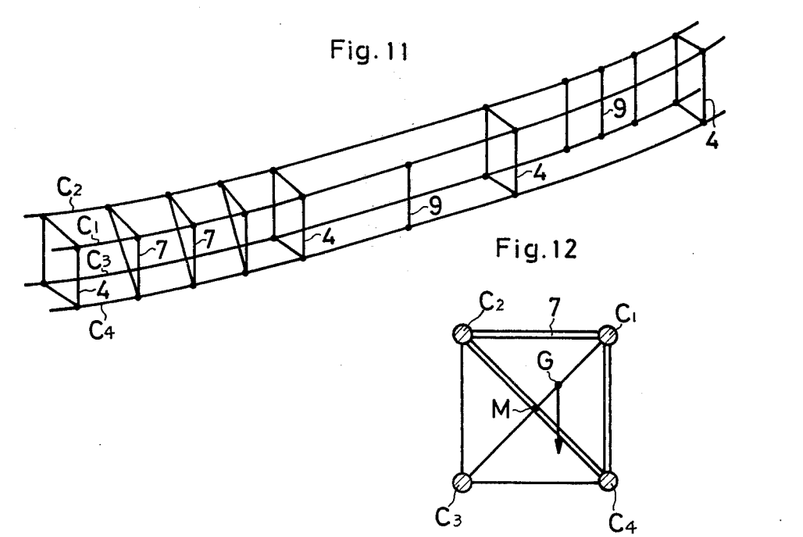
FIG. 11 is a simplified perspective view showing three-conductor or two-conductor spacers mounted asymetrically with respect to the center line of the overhead transmission lines.
FIG. 12 is a sectional view of a 3-conductor spacer mounted on the four-conductor transmission line of FIG. 11.

In a further embodiment of the present invention, instead of mounting a weight through a conductor spacer, there is provided a conductor spacer asymmetric with respect to the center line of the transmission line system so that the center of gravity of the spacer is spaced from the center of the line. FIG. 11 schematically illustrates the above embodiment. In the drawing 4 designates four-conductor spacers provided in a desired spaced relation. Also, three-conductor spacers 7 or two-conductor spacers 9 are mounted at an optional position between the four-conductor spacers 4 in a span of the line. Since the center of gravity G of the 3-conductor spacer 7 is spaced from the axial vertical plane including the center M as shown, each spacer 7 serves as an eccentric weight according to the present invention. Three-conductor spacers other than that shown in FIG. 12, can also be regarded as eccentric weights where disposed to connect conductors C1, C3 and C4, respectively; and conductors C2, C3, and C4. However, in the case of 2-conductor spacers 9, eccentric weights are formed only where disposed between the conductors C1 and C4, and between the conductors C2 and C3, respectively. In the case of multi-conductor transmission line, it is also preferred to have the eccentric weights distributed evenly on each side of the center line of the transmission line to prevent a torsional moment from being exerted on the line in one direction of rotation.

In the foregoing embodiments, the magnitude of W' and K' is determined by solving the specified inequality for compensating network to stabilize the oscillation feedback network, so that the eccentric weight characterized by the thus obtained W' and K' can completely prevent or eliminate galloping of the overhead transmission line. In view of practical application, however, it is not necessarily required to completely eliminate galloping, but it is sufficient to suppress the galloping within the amplitude allowable for practical purposes or enough to prevent possible occurrence of troubles or accidents, for example tangling of the lines, due to such galloping oscillation.

In fact, since the overhead transmission line is subjected to various phenomena other than galloping due to a wind, ice and/or snow adhering to the line, the design of the pylons or the arrangement of the transmission lines are, in practice, made giving a consideration so that a considerable allowance of the movements of the transmission line is afforded. Then, it is required to suppress the amplitude of the galloping within such an allowance and it is possible according to the present invention to control the amplitude of the galloping to a predetermined level by selecting the magnitude of the product of K' and W' of the eccentric weight. Differently stated, it is intended in the present invention to suppress the amplitude of the galloping when the number of loops appearing in the span is two, by employing the eccentric weight, to half or less of the galloping amplitude of the transmission line where no eccentric weight is employed.

The amplitude of the oscillation of the overhead transmission line with the eccentric weight secured thereto is given by solving the following equations:

$$A = \sqrt{-\frac{4E_1}{3E_2}}$$

$$E_1 = \frac{\pi \rho d V^2}{2} \left\{ \frac{C_{L1} - C_{D0}}{V} \omega + \frac{C_{m1}}{V} \omega k c \right\}$$

$$E_2 = \frac{\pi \rho d V^2}{2} \left\{ \frac{C_{L1} - 3C_{D0} - 6C_{D2}}{8V^3} \omega^2 - \frac{C_{m2}}{4V} \omega k c^2 + \frac{C_{m1}}{2} \omega^3 k c \right\}$$

$$kc = \frac{\omega^2 K' W'}{\left\{ g \left( \frac{n\pi}{l} \right)^2 GI_p - \left( J + \frac{K'W'}{g} \right) \omega^2 \right\}}$$

$$\omega = \frac{n}{2l} \sqrt{\frac{gT}{W}}$$

where

A is an amplitude ($m$) of oscillation of the transmission line, $\phi$ is air density (kg.sec$^2$/m$^4$), $d$ is the outer diameter ($m$) of the line, V is the velocity (m/sec) of the lateral wind, $C_{L1}$ is the coefficient of the lift force caused by the wind, $C_{D0}$ and $C_{D2}$ are the coefficients of the drag force caused by the wind, $C_{m1}$ is the coefficient of rotational moment, $l$ is the span length ($m$) of the line, $n$ is the number of loops appearing in the span, $GI_p$ is the torsional rigidity (kg.m$^2$.rad.) of the line, J is the moment (Kg.sec$^2$) of inertia of the line per unit length, $g$ is acceleration (m/sec$^2$) of the gravity, T is the tensile force (kg) of the line, and W is the weight of the line per unit length (kg/m).

Figure 13:
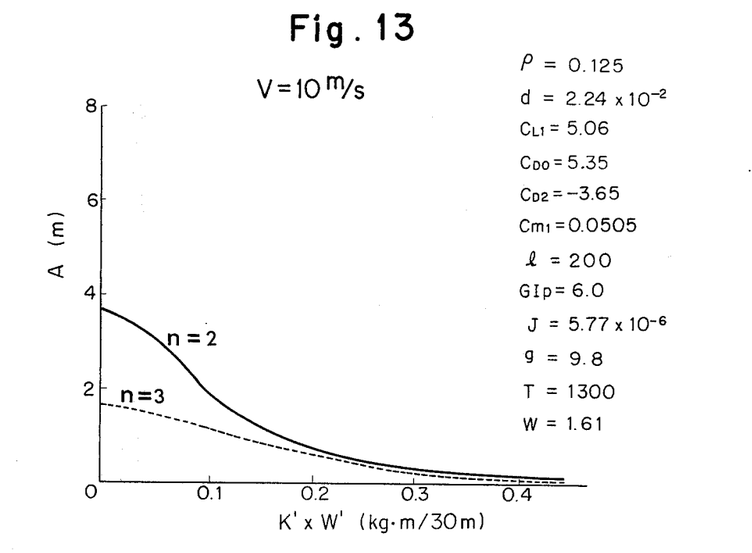
FIGS. 13 and 14 are diagrams of exemplified characteristic curves showing the relationship between amplitude of galloping of the line and the magnitude of $K'$ and $W'$ of the eccentric weight.
Figure 14:
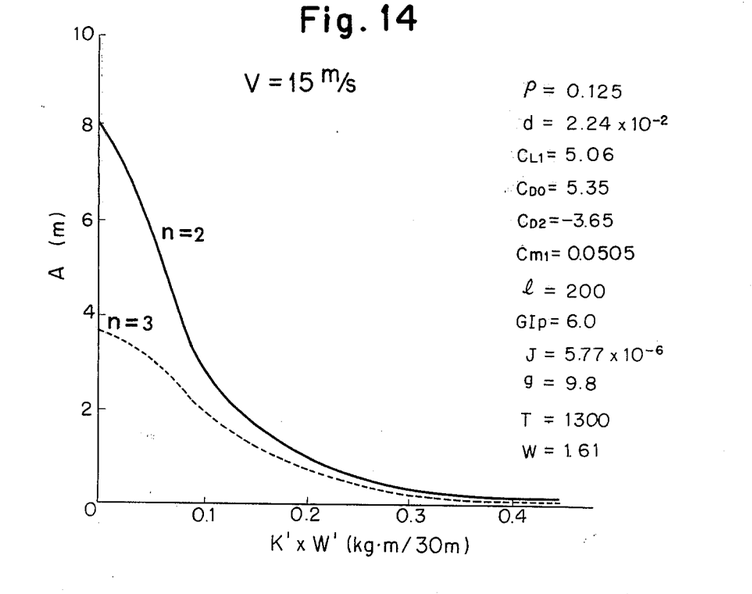

Thus, the amplitude is expressed in relation to the product of K' and W', for example as shown in FIGS. 13 and 14. The characteristic curve of the relationship between the amplitude of the galloping and the product of K' and W' varies depending upon the velocity of lateral wind and the number of loops appearing in the span, even when all the other factors of the above formulae are set. In fact, said other factors such as air density, coefficients of lift and drag forces caused by wind, etc. change continually, but they have average values obtained by the measurement in installation of the line and widely applied in the field throughout the world. Therefore, the values of these factors (i.e. $l$, $C_{L1}$, $C_{D0}$, $C_{D2}$, $C_{m1}$) can be treated as constants. 0.125 kg.sec$^2$/m$^4$, 5.06, 5.35, $-3.65$ and 0.0505 are given for air density, coefficient of the lift and drag forces and coefficient of rotational moment, respectively.

In this connection, it is to be noted that galloping is most likely to occur with a lateral wind within the range of 10 to 15 m/sec. Further, it is to be noted that serious troubles are most likely to be caused by the galloping when the number of the loops appearing in the span is two or three. However, as apparent from FIGS. 13 and 14, according to the present invention, the consideration to the case where n=2 is sufficient for purpose. In FIGS. 13 and 14, there are shown illustrative examples in which the other factors than the velocity of the lateral wind and the number of the loops appearing in the span are specified according to the intended design of the transmission line. The characteristic curves obtained for the varied velocities of the lateral wind, namely, 10 m/sec and 15 m/sec are separately shown in FIGS. 13 and 14, respectively. According to the number of loops appearing in the span, two curves are obtained for $n$=2 and $n$=3 in each FIGURE. As can be seen from the graphs of FIGS. 13 and 14, K' × W' must be about 0.1 or more to suppress the amplitude of galloping with n=2 to half or less of its amplitude of the transmission line employing no eccentric weight when the velocity of lateral wind is 10 m/sec, while K'× W' must be about 0.07 or more when the velocity of lateral wind is 15 m/sec. Accordingly, in the case of FIGS. 13 and 14, the magnitude of K' and W' is determined so that the product thereof may be about 0.1 or more. In the practical application of the thus obtained product of K' and W', K' is decided so that it is of a practically acceptable length, in general, about 0.1 m.

The eccentric weights characterized by the thus obtained K' and W' are secured to the transmission line preferably at positions equally spaced from one another in the span length of the transmission line in such a manner as suitable to exert an effect of the eccentric weight as large as possible, minimize the torsion of the line in a normal condition, cause no undesireable phenomena other than galloping on the line and facilitate the mounting operation. More particularly, the eccentric weights are secured to the transmission line at equal distances of 20 to 80 m, alternatingly in the opposite directions.

As is easily comprehensible from the foregoing description, the present eccentric weights are applicable to both overhead transmission lines comprising one conductor and lines comprising a plurality of conductors.

What is claimed is:

1. In combination with an overhead transmission line, a vibration damper for preventing galloping of the line, comprising one or more eccentric weights rigidly secured to the line with its center of gravity spaced from the vertical plane including the axis of the line, in which W' (the weight of the eccentric weight) and K' (the amount of its eccentricity) are given by solving the following equations of the amplitude of the oscillation of the line with the weights secured thereto when experiencing a lateral wind:

$$A = \sqrt{-\frac{4E_1}{3E_2}}$$

$$E_1 = \frac{\pi \rho d V^2}{2} \left\{ \frac{C_{L1}-C_{D0}}{V} \omega + \frac{C_{m1}}{V} \omega ke \right\}$$

$$E_2 = \frac{\pi \rho d V^2}{2} \left\{ \frac{C_{L1}-3C_{D0}-6C_{D2}}{8V^3} \omega^3 - \frac{C_{D2}}{4V} \omega ke^2 + \frac{C_{m1}}{2} \omega^3 ke \right\}$$

$$ke = \frac{\omega^2 K' W'}{g \left\{ \left(\frac{n\pi}{l}\right)^2 GI_p - \left(J + \frac{K'W'}{g}\right) \omega^2 \right\}}$$

$$\omega = \frac{n}{2l}\sqrt{\frac{gT}{W}}$$

for the values of W' and K' under the additional conditions that the amplitude of the oscillations of the line with the eccentric weights is half or less of the amplitude of the oscillation of the line without the eccentric weights when $n = 2$ where A is the amplitude ($m$) of oscillation of the transmission line, $\phi$ is expected air density (Kg.sec$^2$/m$^4$)

$d$ is the outer diameter ($m$) of the line,

V is the expected velocity (m/sec) of the lateral wind which maximizes the product of K' and W', $C_{L1}$ is the coefficient of the lift force caused by the wind, $C_{D0}$ and $C_{D2}$ are the coefficients of the drag force caused by the wind, $C_{m1}$ is the coefficient of rotational moment; $l$ is the span length ($m$) of the line, $n$ is 2, $GI_p$ is the torsional rigidity (kg.m$^2$.rad) of the line, J is the moment of inertia of the line per unit length (Kg.sec$^2$), $g$ is the acceleration (m/sec$^2$) of the gravity, T is the tensile force (kg) of the line, and W is the weight of the line per unit length (kg/m).

2. The combination according to claim 1, wherein said eccentric weights are disposed on the transmission line at equal intervals of 20 to 80 m.

3. A combination according to claim 1 in which the transmission line comprises a plurality of conductors suspended in mutually spaced relationship, the eccentric weight being secured with respect to the transmission line with the center of gravity of the weight spaced from the vertical plane including the center line of the transmission line.

4. The combination according to claim 3 in which the eccentric weight is secured to a spacer mounted on the conductors.

5. The combination according to claim 3 in which the eccentric weight is provided by a spacer mounted on the conductors.

6. A combination according to claim 1, in which the transmission line comprises a plurality of conductors suspended in mutually spaced relationship the eccentric weight being secured to the respective conductor with the center of gravity of the weight spaced from the vertical plane including the axis of the conductor.

7. A method for preventing galloping of an overhead transmission line, comprising the steps of providing one or more weights $W'$ adapted to be rigidly secured to the line with its center of gravity spaced from the vertical plane including the axis of the line by a distance $K'$, determining the magnitude of $W'$ and $K'$ by solving the following equations for the amplitude of the galloping of the line with the weights secured thereto when experiencing a lateral wind:

$$A = \sqrt{-\frac{4E_1}{3E_2}}$$

$$E_1 = \frac{\pi \rho d V^2}{2} \left\{ \frac{C_{L1} - C_{D0}}{V} \omega + \frac{C_{m1}}{V} \omega ke \right\}$$

$$E_2 = \frac{\pi \rho d V^2}{2} \left\{ \frac{C_{L1} - 3C_{D0} - 6C_{D2}}{8V^3} \omega^3 - \frac{C_{D2}}{4V} \omega ke^2 + \frac{C_{m1}}{2} \omega^3 ke \right\}$$

$$ke = \frac{\omega^2 K' W'}{g\left\{\left(\frac{n\pi}{l}\right)^2 GI_p - \left(J + \frac{K'W'}{g}\right)\omega^2\right\}}$$

$$\omega = \frac{n}{2l}\sqrt{\frac{gT}{W}}$$

for the values of $W'$ and $K'$ under the additional conditions that the amplitude of the galloping of the line with the eccentric weights is half or less of the amplitude of the oscillation of the line without the eccentric weights when $n = 2$ where A is an amplitude (m) of oscillation of the transmission line;
$\phi$ is expected air density (Kg-sec$^2$/m$^4$)
$d$ is the outer diameter (m) of the line;
V is the expected velocity (m/sec) of the lateral wind which maximizes the product of $K'$ and $W'$;
$C_{L1}$ is the coefficient of the lift force caused by the wind;
$C_{D0}$ and $D_{D2}$ are the coefficients of the drag force caused by the wind;
$C_{m1}$ is the coefficient of rotational moment,
$l$ is the span length (m) of the line,
$n$ is 2;
$GI_p$ is the torsional rigidity (kg.m$^2$.rad) of the line,
J is the moment of inertia of the line per unit length (Kg.sec$^2$)
$g$ is the acceleration (m/sec$^2$) of the gravity,
T is the tensile force (kg) of the line, and
W is the weight of the line per unit length (kg/m), and then rigidly securing said weights $W'$ to the line so that the centers of gravity of said weights $W'$ are spaced a distance $K'$ from the axis of the line.

* * * * *